United States Patent
Brown et al.

(10) Patent No.: US 9,183,255 B1
(45) Date of Patent: Nov. 10, 2015

(54) SPOOL MANAGEMENT AND CHECKPOINTING IN A MULTI-DATABASE SYSTEM

(75) Inventors: Douglas P. Brown, Rancho Santa Fe, CA (US); Scott E. Gnau, Escondido, CA (US); John M. Morris, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 1382 days.

(21) Appl. No.: 12/649,891

(22) Filed: Dec. 30, 2009

(51) Int. Cl.
*G06F 17/30* (2006.01)

(52) U.S. Cl.
CPC .................. *G06F 17/30463* (2013.01)

(58) Field of Classification Search
CPC ............... G06F 17/30463; G06F 17/30067; G06F 2201/84
USPC .................... 707/747, 649, 698, 713
See application file for complete search history.

(56) References Cited

U.S. PATENT DOCUMENTS

| | | | |
|---|---|---|---|
| 6,470,331 B1* | 10/2002 | Chen et al. ............ | 707/718 |
| 7,054,852 B1* | 5/2006 | Cohen .................. | 707/707 |
| 7,234,112 B1* | 6/2007 | Brown et al. .......... | 715/713 |
| 8,108,382 B1* | 1/2012 | Brown et al. .......... | 707/715 |
| 2002/0198863 A1* | 12/2002 | Anjur et al. .......... | 707/707 |
| 2005/0187891 A1* | 8/2005 | Johnson et al. ....... | 707/707 |
| 2006/0136396 A1* | 6/2006 | Brobst ................. | 707/707 |
| 2007/0136346 A1* | 6/2007 | Morris et al. ......... | 707/707 |
| 2008/0306989 A1* | 12/2008 | Boyce et al. .......... | 707/707 |
| 2009/0228446 A1* | 9/2009 | Anzai et al. .......... | 707/3 |
| 2010/0115205 A1* | 5/2010 | Brown et al. .......... | 711/135 |
| 2010/0332458 A1* | 12/2010 | Xu et al. .............. | 707/673 |
| 2011/0246448 A1* | 10/2011 | Tatemura et al. ...... | 707/714 |

* cited by examiner

*Primary Examiner* — Robert Beausoliel, Jr.
*Assistant Examiner* — Alexandria Bromell
(74) *Attorney, Agent, or Firm* — Howard Speight PLLC

(57) ABSTRACT

A query is executed on a multi-database system. The multi-database system includes a first system database and a second system database. The query is partially executed on a first system database by generating a spool. It is determined that it is more efficient to store the spool on the second system database than to store the spool on the first system database, and in response the spool is stored on the second system database. The query execution is continued by accessing the spool on the second system database, completing execution of the query to produce a result, and storing the result.

20 Claims, 7 Drawing Sheets

SPOOL MANAGEMENT AND CHECKPOINTING IN A MULTI-DATABASE SYSTEM

BACKGROUND

Spools are used to store intermediate results (or final answer sets) in database systems. Checkpointing is used to recover from failures. Spooling and checkpointing are challenging in a multi-database system.

SUMMARY

In general, in one aspect, the invention features a method for executing a query on a multi-database system. The multi-database system includes a first system database and a second system database. The method includes partially executing the query on a first system database by generating a spool. The method further includes determining that it is more efficient to store the spool on the second system database than to store the spool on the first system database, and in response storing the spool on the second system database. The method further includes continuing to execute the query by accessing the spool on the second system database, completing execution of the query to produce a result, and storing the result.

Implementations of the invention may include one or more of the following. Storing the result may include storing the result on a third database system. Determining that it is more efficient to store the spool on the second system database than to store the spool on the first system database may include determining the existence of a condition selected from a group of conditions consisting of: the first system database being low on spool space, the first system database being instantiated with read-only storage, the first system database having low disk write performance, and storage of the spool on the first system database would be inefficient for a database reason. The spool may include a plurality of rows and the first system database may include a large number of processors and may use a hashing algorithm to determine how to distribute storage across the large number of processors. The hashing algorithm may distribute a small number of the spool rows to each of the large number of processors. Continuing to execute the query may include continuing to execute the query on a system database selected from a group of system databases consisting of the first system database, the second system database, and a system database that is neither the first system database nor the second system database. The method may further include checkpointing the spool on a system database at an intermediate point in processing the query. The method may further include determining that a workload management exception occurred, and as a result, checkpointing the spool. Checkpointing the spool on a system database may include checkpointing the spool on a system database selected from the group consisting of the first system database and the second system database. Checkpointing the spool may include using a checkpointing method selected from the group consisting of generating a duplicate spool as the spool is generated using replication and bulk copying the spool after it has been generated in full. Execution of the query may follow a branching optimizer plan tree having a plurality of nodes and checkpointing may be performed only at a node having at least one alternative branch.

In general, in another aspect, the invention features a multi-database system including a first system database and a second system database. Each of the system databases includes one or more nodes. Each of the system databases includes a plurality of CPUs, each of the one or more nodes providing access to one or more CPUs. Each of the system databases includes a plurality of virtual processes, each of the one or more CPUs providing access to one or more virtual processes. Each virtual process is configured to manage data, including rows from the set of database table rows, stored in one of a plurality of data-storage facilities. The multi-database system further includes a process to partially execute the query on a first system database by generating a spool. The process further determines that it is more efficient to store the spool on the second system database than to store the spool on the first system database, and in response stores the spool on the second system database. The process continues to execute the query by accessing the spool on the second system database. The process completes execution of the query to produce a result. The process stores the result.

In general, in another aspect, the invention features a computer program, stored in a computer-readable tangible medium, for optimizing execution of a query on a multi-database system. The multi-database system includes a first system database and a second system database. The program includes executable instructions that cause a computer to partially execute the query on a first system database by generating a spool. The program further includes executable instructions that cause the computer to determine that it is more efficient to store the spool on the second system database than to store the spool on the first system database, and in response, store the spool on the second system database. The program further includes executable instructions that cause the computer to continue to execute the query by accessing the spool on the second system database. The program further includes executable instructions that cause the computer to complete execution of the query to produce a result. The program further includes executable instructions that cause the computer to store the result.

DETAILED DESCRIPTION

Figure 1:
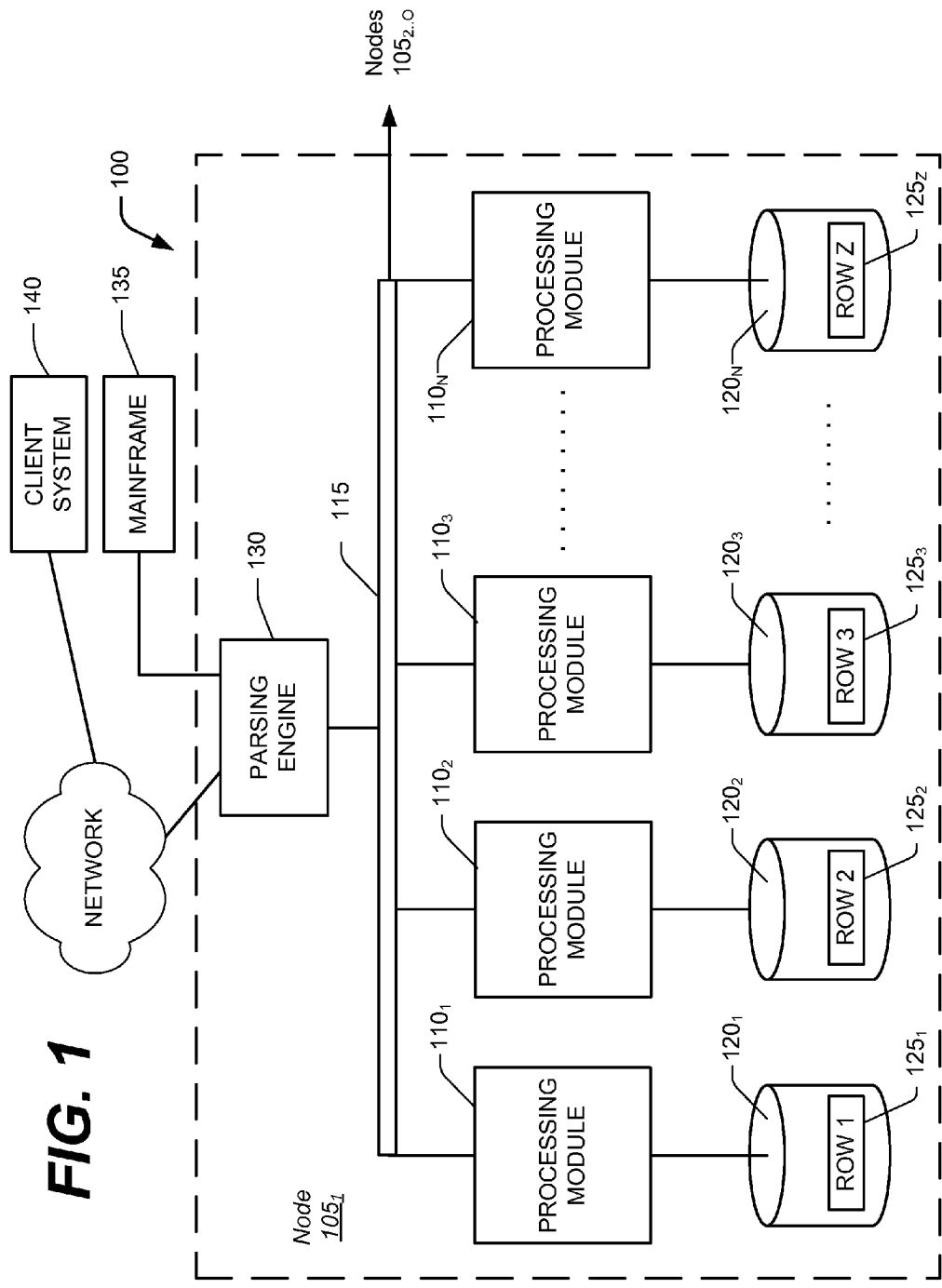
FIG. 1 is a block diagram of a node of a database system.

The spool management and checkpointing technique disclosed herein has particular application, but is not limited to, large databases that might contain many millions or billions of records managed by a database system ("DBS") 100, such as a Teradata Active Data Warehousing System available from the assignee hereof. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots N}$ in addition to the illustrated node $105_1$, connected by extending the network 115.

The system stores data in one or more tables in the data-storage facilities $120_{1 \ldots N}$. The rows $125_{1 \ldots z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBS 100 usually receives queries and commands to build tables in a standard format, such as SQL.

In one implementation, the rows $125_{1 \ldots z}$ are distributed across the data-storage facilities $120_{1 \ldots N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1 \ldots N}$ and associated processing modules $110_{1 \ldots N}$ by a hash bucket map. The characteristics of the columns chosen for the primary index determine how evenly the rows are distributed.

In addition to the physical division of storage among the storage facilities illustrated in FIG. 1, each storage facility is also logically organized. One implementation divides the storage facilities into logical blocks of storage space. Other implementations can divide the available storage space into different units of storage. The logical units of storage can ignore or match the physical divisions of the storage facilities.

Figure 2:
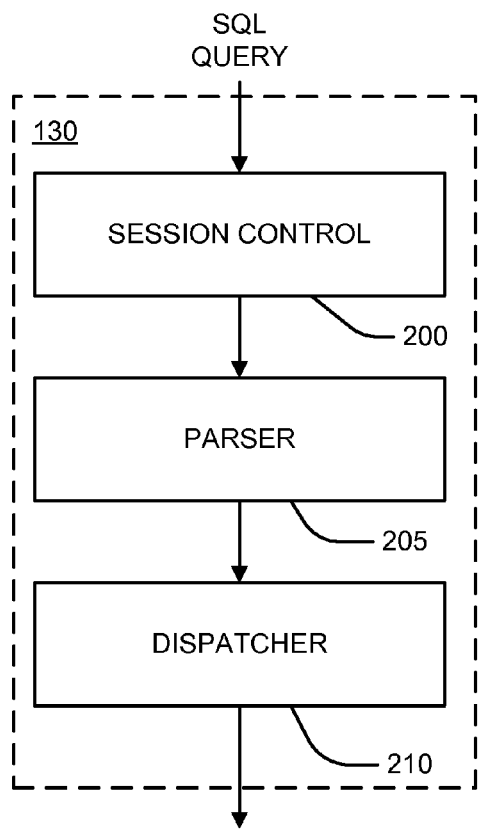
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
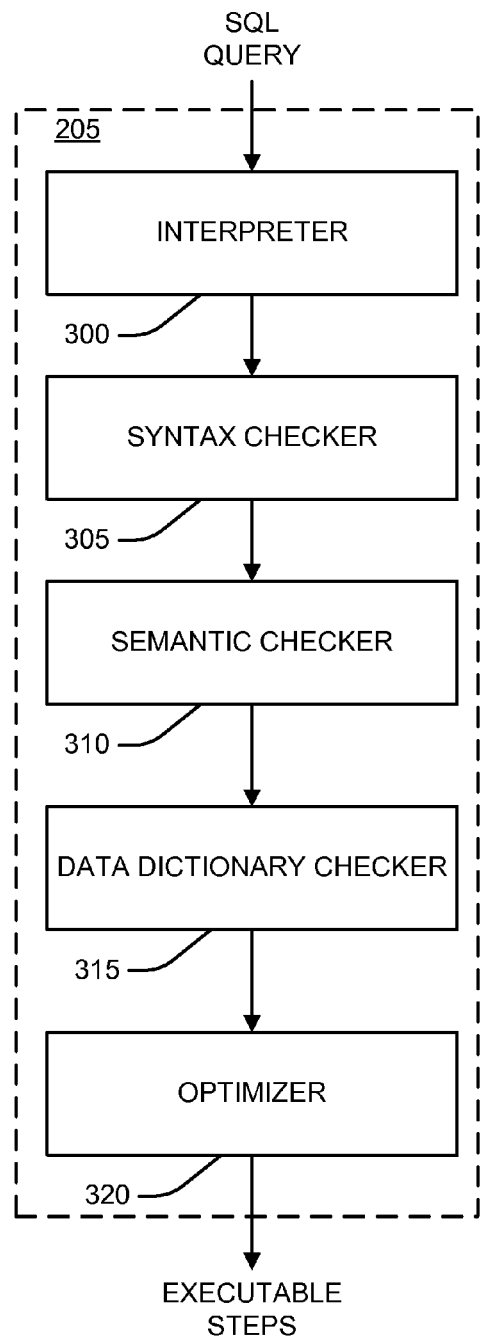
FIG. 3 is a flowchart of a parser.

Once the session control 200 allows a session to begin, a user may submit a SQL query, which is routed to the parser 205. As illustrated in FIG. 3, the parser 205 interprets the SQL query (block 300), checks it for proper SQL syntax (block 305), evaluates it semantically (block 310), and consults a data dictionary to ensure that all of the objects specified in the SQL query actually exist and that the user has the authority to perform the request (block 315). Finally, the parser 205 runs an optimizer (block 320), which develops the least expensive plan to perform the request and produces executable steps to execute the plan. A dispatcher 210 issues commands to the processing modules $110_{1 \ldots N}$ to implement the executable steps.

Figure 4:
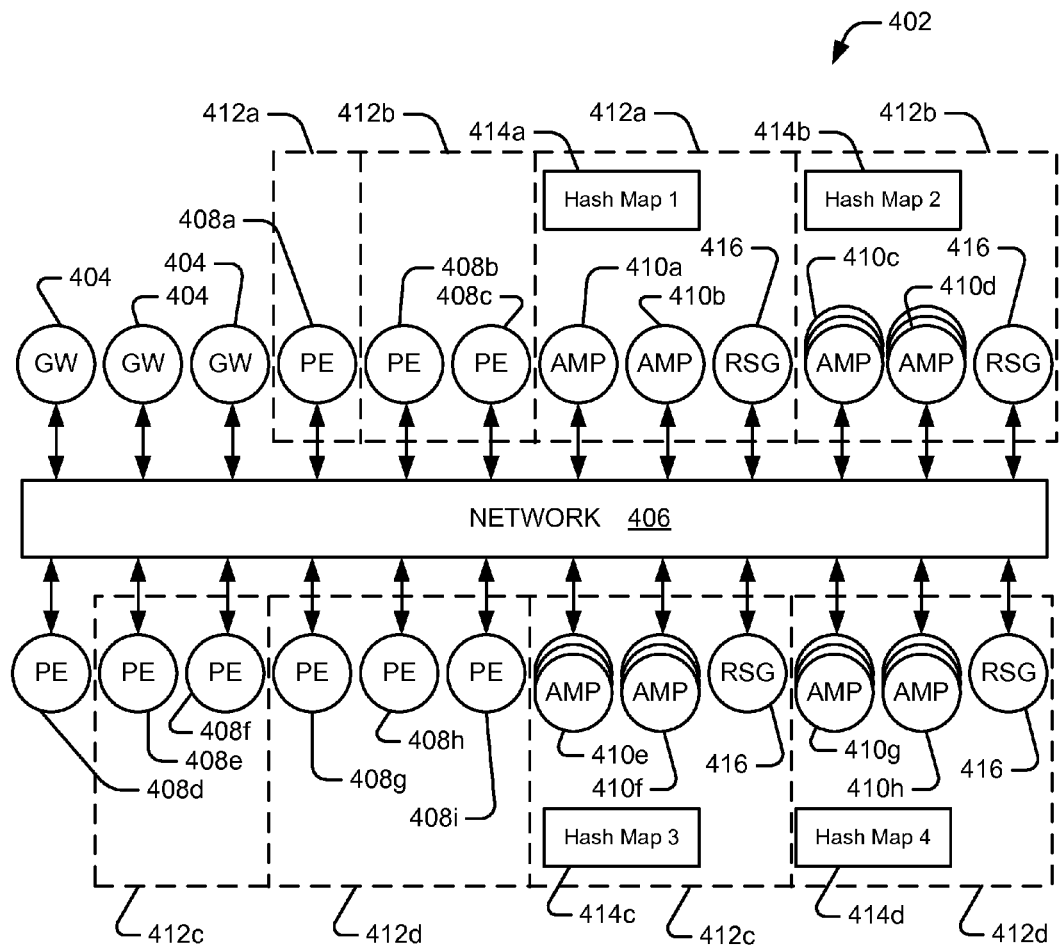
FIG. 4 is a block diagram of a multi-database system.

FIG. 4 illustrates one embodiment of a multi-database system 402 having a plurality of system databases of the type illustrated in FIG. 1. In one embodiment, one or more gateways ("GW") 404 provide an interface from a local area network ("LAN") or other communications network, such as the Internet or a wireless network, to a network 406 that interconnects the components of the multi-database system 402. In one embodiment, the gateways 404 receive messages from a LAN and convert them to a message format used on the network 406. In one embodiment, this entails encapsulating messages received via the LAN in a wrapper appropriate for the network 406.

In one embodiment, the virtual parsing engines ("PE") 408*a-i* perform the functions of the parsing engine 130 described above. In one embodiment, however, the virtual parsing engines 408*a-i* are not fixedly assigned to a set of processing modules 110. Instead, the mapping between virtual parsing engines 408*a-i* and processing modules 110 is variable depending on the current needs of the system. In one embodiment, one of the virtual parsing engines, 408*a*, serves as a virtual regulator, providing the functions described in co-pending U.S. patent application Ser. No. 11/891,919, entitled "Dynamic Query Optimization Between Systems Based On System Conditions," incorporated by reference, and co-pending U.S. patent application Ser. No. 11/716,889, entitled Virtual Regulator for Multi-Database Systems, filed on Mar. 12, 2007, incorporated by reference.

In one embodiment, Access Module Processors ("AMPs") 410*a-h*, which are generally equivalent to the processing modules $110_{1 \ldots N}$ shown in FIG. 1, are grouped as shown by the dashed boxes 412*a-d* in FIG. 4. In one embodiment, each group 412*a-d* is a DBS 100 (or system database). In one embodiment, each system database 412*a-d* is assigned one or more virtual PEs 408*a-i*. In the example shown in FIG. 4, virtual PE 408*a* is assigned to system database 412*a* as indicated by the dashed box enclosing that item. Further, virtual PEs 408*b* and 408*c* are assigned to system database 412*b*, virtual PEs 408*e* and 408*f* are assigned to system database 412*c*, and virtual PEs 408*g*, 408*h*, and 408*i* are assigned to system database 412*d*. Virtual PE 408*d* is not assigned to any system database and is being held "in reserve." In one embodiment, hash maps 414*a-d* identify which system database and AMP 410*a-h* is to receive a message directed to one of the system databases 412*a-d*. For example, if a message is directed to system database 412*a*, the virtual PE 408*a* that is assigned to system database 412*a* will use hash map 414*a* to determine if the message is to be delivered to AMP 410*a* or AMP 410*b*. Some of the AMPs in FIG. 4, such as AMP 410*c*, are represented as overlapping circles, indicating that AMP 410*c* is a plurality of AMPs. Generally, in one embodiment, the groups 412*a-d* can contain any number of AMPs. Each system database 412*a-d* includes a replication service group ("RSG") 416 that coordinates applying changes made to data in one system database to the same data replicated in another system database.

In multi-database systems, such as the system shown in FIG. 4 and such as that described in co-pending U.S. patent application Ser. No. 11/985,910, entitled "Dynamic Query and Step Routing Between Systems Tuned for Different Objectives," filed Nov. 19, 2007, incorporated by reference, new opportunities may arise for query execution when various conditions occur along the normal query path. In one embodiment, the optimizer recognizes conditions that impact the desirability of continuing with the existing query path and allows redirection to another query path.

Figure 5:
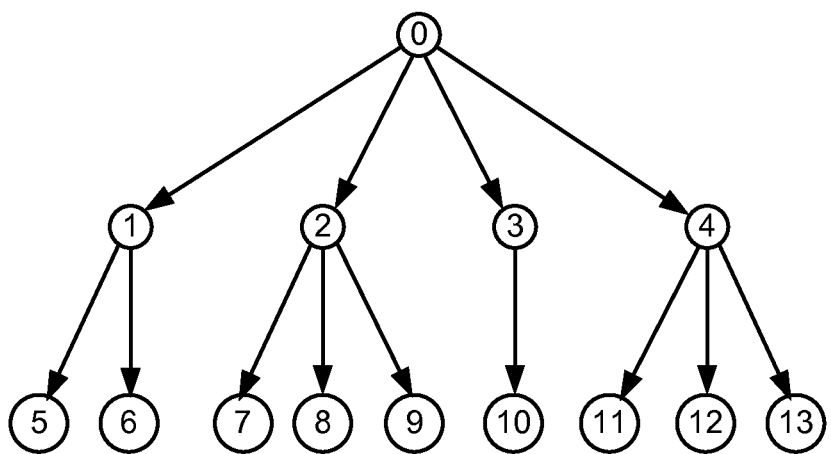
FIG. 5 illustrates alternative query paths.

For example, the optimizer may identify four initial alternative query paths, as shown in FIG. 5. In FIG. 5, the query path begins at node 0 and can follow one of four alternative paths: (1) to node 1, (2) to node 2, (3) to node 3, or (4) to node 4. Such a multiplicity of query paths is especially possible in multi-database systems such as that shown in FIG. 4. For example, referring to FIG. 4, the query path for node 1 may be for system database 412a to perform the first step. The query path for node 2 may be for system database 412b to perform the first step. The query path for node 3 may be for system database 412a and system database 412b to each perform a share of the first step. The query path for node 4 may be for all of system databases 412a, 412b, 412c, and 412d to each perform a share of the first step.

The query path may follow one of two alternative paths out of node 1: (1) to node 5, and (2) to node 6. The query path may follow one of three alternative paths out of node 2: (1) to node 7, (2) to node 8, and (3) to node 9. The query path has only a single path out of node 3, which is to node 10. The query path may follow one of three alternative paths out of node 4: (1) to node 11, (2) to node 12, and (3) to node 13. It will be recognized that the alternative query plans illustrated in FIG. 5 are merely an example and can be simpler or much more complicated. For example, the number of levels can be increased from three (including the level that includes only the starting node 0) to an arbitrary number.

In one embodiment, the optimizer 320 identifies alternative plan branches at the time of initial optimization. In other words, in this embodiment, the optimizer 320 identifies all alternative query paths (e.g., all nodes in FIG. 5) at the beginning of optimization.

In one embodiment, the optimizer 320 identifies alternative plan branches at the time of query rewrite and re-optimization after each execution step. In other words, in this embodiment, the optimizer 320 identifies the next level of alternatives as it moves from one level to another. For example, at the beginning of optimization, the optimizer 320 would identify the second layer of alternatives (i.e., nodes 1, 2, 3, and 4) but not all of the nodes in the layers below. After selecting and executing the selected plan branch from the first layer (e.g., node 2), the optimizer 320 identifies the next level of alternatives (i.e., nodes 7, 8, and 9).

In one embodiment, the optimizer performs a hybrid lookahead optimization that looks one or more steps ahead in the query path and considers at the end of every step in the query plan whether a) to follow the existing query path, b) to follow another branch in pre-identified alternative query paths, or c) to re-plan the entire query plan at the end of each step.

The decision as to whether to change to an alternative plan at each step is made based on feedback. The feedback includes:
Workload definition (hereinafter "WD") throttles;
Overconsumption (e.g. of a CPU or I/O or memory) by a WD;
Surges in concurrency or arrival rate;
System CPU or I/O busy (Wait I/O) or high utilization;
AMPs, PEs, or GTWs down;
Data object inaccessible;
System down;
Unexpectedly high node skew;
Demographics (row cardinalities) do not match prediction based on statistics or heuristics;
Flow control;
AMP congestion (e.g., low AMP worker tasks);
other similar feedback.

Figure 6:
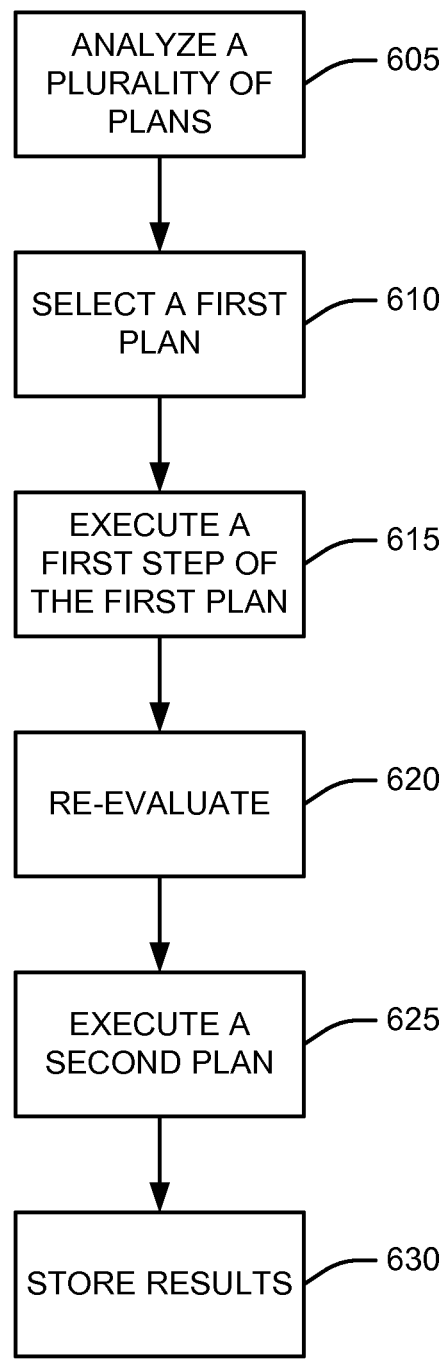
FIG. 6 is a flow chart of an optimization technique.

In operation, in one embodiment illustrated in FIG. 6, the system analyzes a plurality of plans for executing the query (block 605). The system selects a first plan having a first step and a second step (block 610). The system executes the first step of the first plan (block 615). The system re-evaluates the plan selection before executing the second step of the first plan (block 620). The system executes a second plan of the plurality of plans for executing the query to produce a result (block 625). The system stores the result in, for example, a computer memory (block 630).

Saving a Spool Generated in One System Database to Another System Database

In one embodiment, a query is executed in stages as described above. In one embodiment in a multi-database system, stages of query execution are performed by different system databases within the multi-database system. For example, using the example system illustrated in FIG. 4, a first stage of query execution may be performed by system database 412c and a subsequent (or concurrent) stage of execution of the same query may be performed by system database 412d. In one embodiment, data is generated in one stage of query execution that is used in a subsequent stage of query execution. In one embodiment, such data is spool data. In one embodiment, spool data is stored in a spool file. In one embodiment, spool data is stored in some form other than a file. For the purposes of this application, a spool file could be persistent in memory using SSD or persistent on disk depending on how the virtual database machine is configured. In one embodiment, spool files are persistent. In one embodiment, spool files are not persistent.

Figure 7:
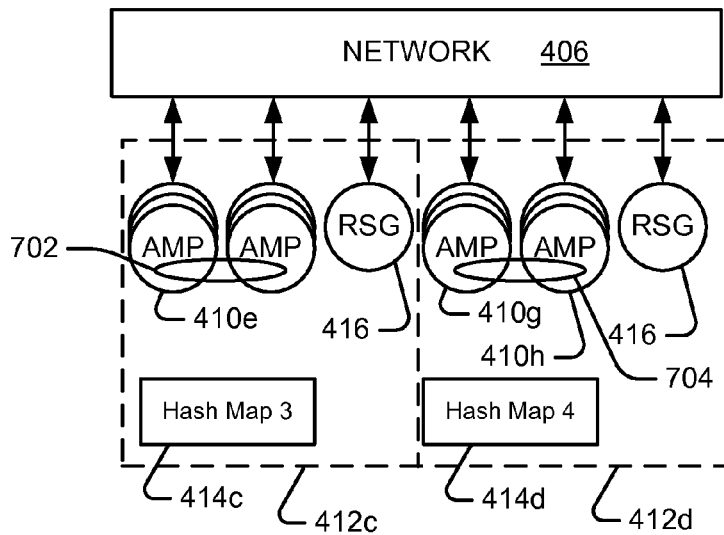
FIG. 7 illustrates a spool generated by a process running on one system database and stored on another system database.

In one embodiment of a multi-database system, spool data need not necessarily be materialized on the set of AMPs on which it is generated. In one embodiment, the spool can be sent to a different set of AMPs with a separate hash map. For example, as shown in FIG. 7 (which is a portion of FIG. 4), a spool generated by process 702 on system database 412c, which is made up of AMPs 410e and 410f and hash map 414c, may be stored on system database 412d, which is made up of AMPs 410g and 410h and hash map 414d, where it is stored as spool 704.

In one embodiment, it may be better or more efficient to send a spool to a different set of AMPs than on which it originates:
when the originating set of AMPs (i.e., AMPS 410e and 410f in the example above) is low or out of spool space (i.e., space dedicated by the system database to spool storage);
when the originating set of AMPs is instantiated with read only storage;
when the disk write performance on the originating set of AMPs is particularly poor or resource consumptive;
when the storage of the spool file would be inefficient on the originating set of AMPs (for example only a few rows, just a thousand rows, for example, hash to each AMP and there are a large number of AMPs, i.e., more than 10 AMPs, for example).

In one embodiment, the spools are hash distributed. That is, the spool rows are distributed among the AMPs according to a hash function. In one embodiment, AMP-local spools are stored remotely. In one embodiment, a spool is "AMP-local" when the primary key or hash code of the primary index of the spool remains local to the AMP. That is, the rows of a materialized AMP-local spool do not need to be re-distributed because the hash code matches that of the local AMP. For example, a small table such as the TPCD Nation table is a candidate to remain on a local AMP for a given step of the query materializes to a local AMP. In one embodiment, such AMP-local spools require the same number of AMPs in each AMP set and use the same hash function.

In one embodiment, subsequent steps in a query plan for executing the query access the spool directly from the other set of AMPs. For example, using the example discussed above and illustrated in FIG. 7, the query continues to be executed by system database 412*c* accessing spool 704 on system database 412*d*.

Alternately, in one embodiment, execution of the query may continue on the set of AMPs where the spool now resides, or some other set of AMPs. For example, using the example discussed above and illustrated in FIG. 7, query execution transfers to system database 412*d* (or system database 412*b* shown in FIG. 4) accessing spool 704 on system database 412*d*.

Checkpointing a Spool.

One traditional approach to handling errors in non-parallel systems, such as those shown in FIGS. 1 and 4, is called "mini-batch" or "checkpointing." Using this approach, the overall processing time for a query is divided into a set of intervals. At the end of each interval, the task enters a "restartable state" called a "checkpoint" and makes a permanent record of this fact. A restartable state is a program state from which processing can be resumed as if it had never been interrupted. If processing is interrupted, it can be resumed from the most recent successful checkpoint without introducing any errors into the final result.

It is sometimes useful to checkpoint a spool.

In one embodiment, a checkpoint includes an independent copy of spool that preserves the work done by the query up to the point that the spool was generated. In one embodiment, spool checkpoints are instantiated between some or all steps of a query plan. In one embodiment, there is no spool before the first step, so there is no corresponding spool checkpoint, but at that point the spool can be considered a null spool for the purposes of re-routing the query before it begins.

In one embodiment, the choice of when to make checkpoints is a tradeoff between the cost of checkpointing the spool and the amount of work to be conserved. Thus, in one embodiment, it may be desirable to checkpoint a spool after particularly long steps or at a convenient point shortly after a long step where spool size is small. Another reason to take a checkpoint is, for example in one embodiment, when a long running query hits a workload definition exception (boundary) and is demoted to run in another workload definition ("WD." In this case, in one embodiment, it would be useful to take a checkpoint to run in another WD. On the other hand, in one embodiment, it may be overkill to checkpoint after every step of a series of short steps even if they have generated small spools. In one embodiment, several spools from previous steps may be present that are copied at a checkpoint.

In one embodiment, checkpointing is only done when at least one alternate branch in a branching optimizer plan tree, such as that shown above in FIG. 5, is available. Otherwise, in one embodiment, there would be no way to continue the query. For example, node 3 in FIG. 5 has only a single branch (to node 10). In that case, in one embodiment, checkpointing is not done at branch 3. Node 2, on the other hand, has three alternative branches (to nodes 7, 8, and 9). In that case, in one embodiment, checkpointing may be done at branch 2. In one embodiment, a spool is checkpointed by inserting a mini-step that does an insert-select or data mover copy of the spool to a different set of AMPs in the multi-database system. In one embodiment, the spool is copied to a location that would be efficient for the alternate branch of the query plan.

Figure 8:
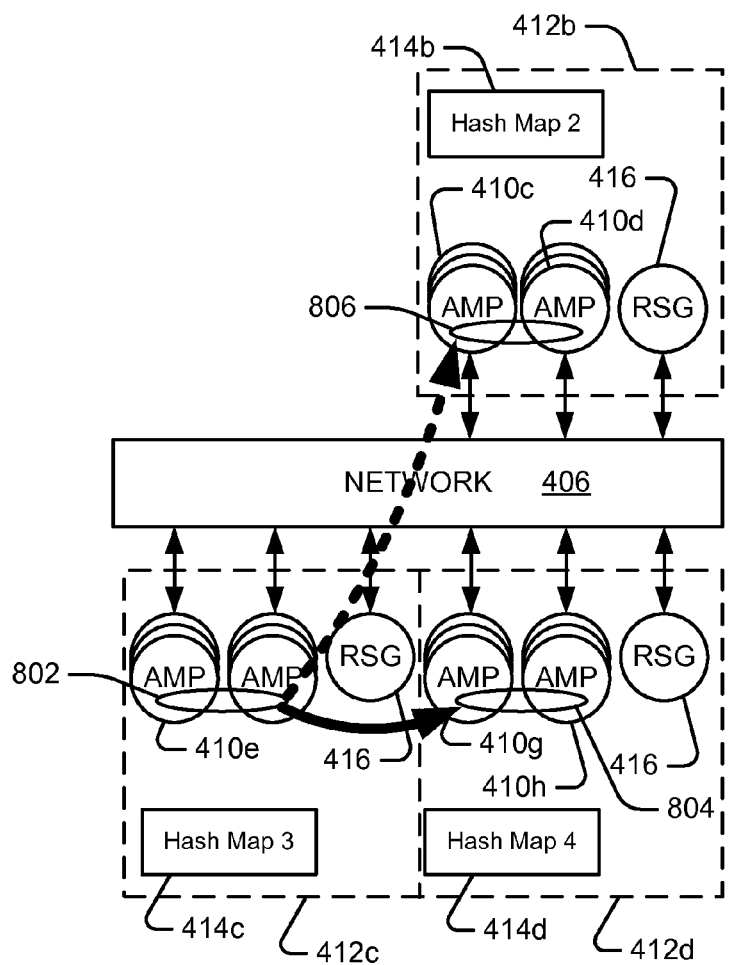
FIG. 8 illustrates a spool saved on one system database and checkpointed on another system database.

As an example, consider a multi-database system, such as that shown in FIG. 8 (which is a portion of the multi-database system shown in FIG. 4), with two system databases 412*c* and 412*d*, each with copies of all base table data (not shown). These systems are redundant and any one has the performance required to provide business continuity in the event of a failure of the other. In this situation the branching query plan is very simple—it is just the same plan steps run on the other system. In one embodiment, between certain steps in the plan the spool 802 that is generated by a process (not shown) running on system database 412*c* is checkpointed to the other system database 412*d* producing spool copy 804 as indicated by the solid heavy curved arrow in FIG. 8. Note that, in one embodiment, the checkpoint information also includes the steps that have been completed, the session number, the request, and the plan, any other database session level attributes such as transaction ID, queryband names, current database name, and other similar information. In one embodiment, some of this information is retained in the PE.

In one embodiment, the spool 802 on system database 412*c* is generated by a process (not shown) running on system database 412*d* and the spool 802 is checkpointed to system 412*d*. In one embodiment, the spool 802 on system database 412*c* is generated by a process (not shown) running on system database 412*d* and the spool 802 is checkpointed to system 412*b*, that is not the system database running the process or the system database where the spool was originally stored, producing spool copy 806 as indicated by the dashed heavy curved arrow.

In one embodiment, the spool copy 804, 806 is produced by replicating the spool 802 as it is being generated, using, for example, the RSGs shown in FIG. 4. In one embodiment, the spool copy 804, 806 is generated after the spool 802 has been generated in full.

In one embodiment, all local spools are converted to hashed spools when they are copied and the alternate plan is generated accordingly.

Figure 9:
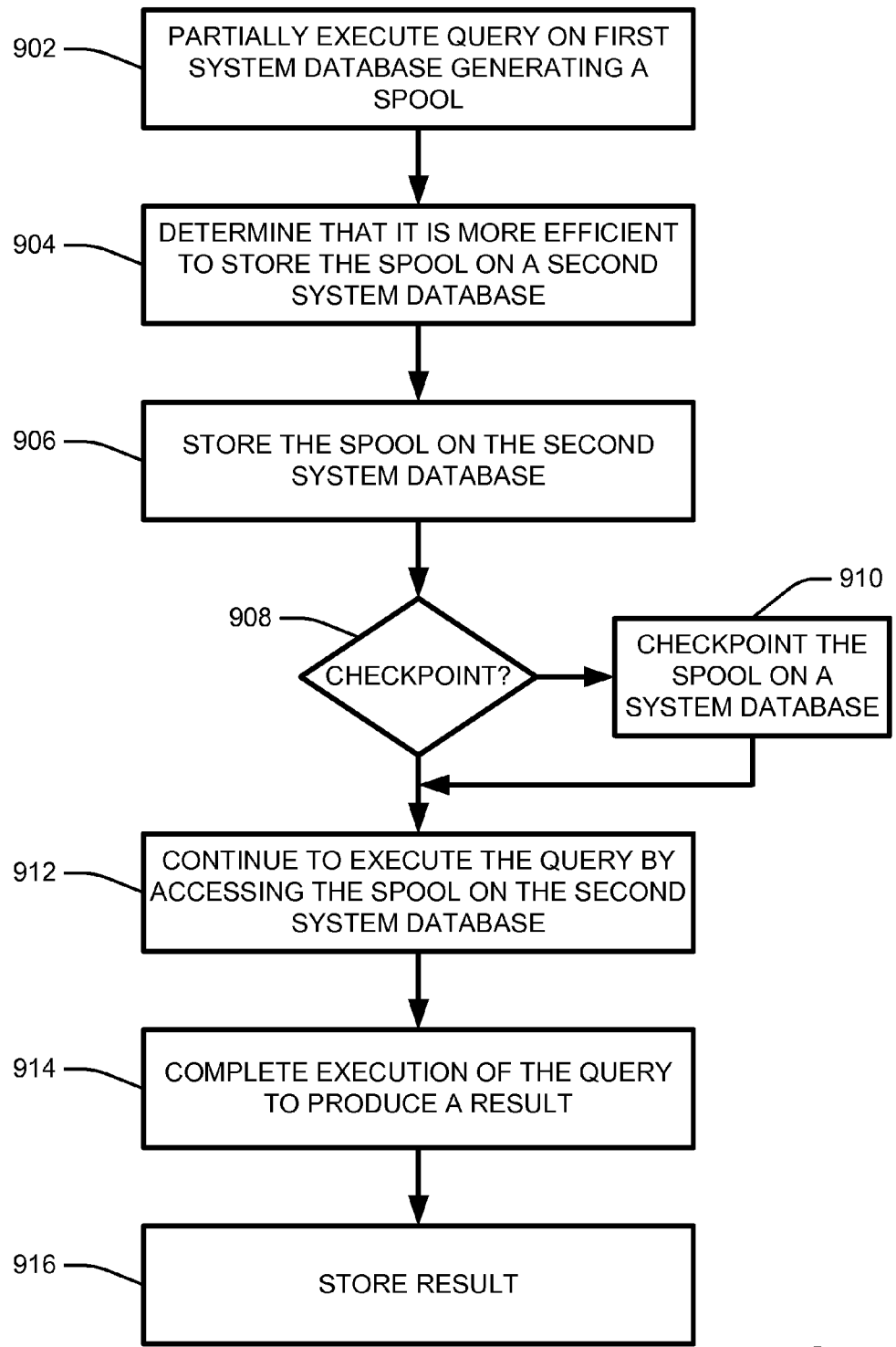
FIG. 9 is a flow chart.

In one embodiment of use, as shown in FIG. 9, a multi-database system, such as the multi-database system 402 shown in FIG. 4, partially executes a query on a first system database, such as system database 412*c*, generating a spool, such as spool 704 in FIG. 7 (block 902). In one embodiment, the system then determines, for the reasons described above, that it is more efficient to store the spool on a second system database, such as system database 412*d*, than to store the spool on the first system database (block 904). In one embodiment, the system stores the spool on the second database system (block 906).

In one embodiment, the system determines, as discussed above, that it is time to make a checkpoint of the spool (block 908). In one embodiment, the system checkpoints the spool on a system database (block 910). In one embodiment, the spool is stored on a system database that is not executing the query and the system checkpoints the spool to the system database executing the query, or to one of the system databases executing the query. In one embodiment, the spool is stored on a system database that is executing the query and the system checkpoints the spool to a system database that is not executing the query. In one embodiment, the spool is stored on a system database that is not executing the query and the system checkpoints the spool to a system database that is neither executing the query nor storing the spool. It will be understood that other permutations are possible.

In one embodiment, the system continues to execute the query by accessing the spool on the second database (block 912). In one embodiment, execution is continued by the system database where the spool is stored. In one embodiment, execution is continued by the system database that began the execution (i.e., in element 902).

In one embodiment, the system completes execution of the query to produce a result (block 914). In one embodiment, the system stores the result (block 916).

In one embodiment, the system loops from block 912 to block 902 and/or to block 908, producing multiple spools and/or multiple checkpoints. In one embodiment, the checkpoints and spools capture the state of query processing between plan steps. In one embodiment, the final answer set, i.e., the "result spool file," is save and/or copied to another database system for later retrieval.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for executing a query on a multi-database system, the multi-database system comprising a first system database and a second system database, the method comprising:
    partially executing the query on the first system database by generating a spool;
    determining that it is more efficient to store the spool on the second system database than to store the spool on the first system database, and in response:
        storing the spool on the second system database;
    continuing to execute the query by accessing the spool on the second system database;
    completing execution of the query to produce a result; and
    storing the result.

2. The method of claim 1 wherein storing the result comprises:
    storing the result on a third database system.

3. The method of claim 1 wherein determining that it is more efficient to store the spool on the second system database than to store the spool on the first system database comprises determining the existence of a condition selected from a group of conditions consisting of:
    the first system database being low on spool space;
    the first system database being instantiated with read-only storage;
    the first system database having low disk write performance; and
    storage of the spool on the first system database would be inefficient for a database reason.

4. The method of claim 1 wherein the spool comprises a plurality of rows and the first system database comprises a large number of processors and uses a hashing algorithm to determine how to distribute storage across the large number of processors and wherein:
    the hashing algorithm would distribute a small number of the spool rows to each of the large number of processors.

5. The method of claim 1 wherein continuing to execute the query comprises continuing to execute the query on a system database selected from a group of system databases consisting of:
    the first system database;
    the second system database; and
    a system database that is neither the first system database nor the second system database.

6. The method of claim 1 further comprising:
    checkpointing the spool on a system database at an intermediate point in processing the query.

7. The method of claim 1 further comprising:
    determining that a workload management exception occurred, and as a result, checkpointing the spool.

8. The method of claim 7 wherein checkpointing the spool on a system database comprises checkpointing the spool on a system database selected from the group consisting of the first system database and the second system database.

9. The method of claim 7 wherein checkpointing the spool comprises using a checkpointing method selected from the group consisting of generating a duplicate spool as the spool is generated using replication and bulk copying the spool after it has been generated in full.

10. The method of claim 7 wherein execution of the query follows a branching optimizer plan tree having a plurality of nodes and wherein:
    checkpointing is performed only at a node having at least one alternative branch.

11. A multi-database system comprising:
    a first system database and a second system database;
    each of the system databases comprising: one or more nodes;
    a plurality of CPUs, each of the one or more nodes providing access to one or more CPUs;
    a plurality of virtual processes, each of the one or more CPUs providing access to one or more virtual processes;
    each virtual process configured to manage data, including rows from a set of database table rows, stored in one of a plurality of data-storage facilities;
    a process to:
    partially execute a query on a first system database by generating a spool;
    determine that it is more efficient to store the spool on the second system database than to store the spool on the first system database, and in response:
    store the spool on the second system database; continue to execute the query by accessing the spool on the second system database;
    complete execution of the query to produce a result; and
    store the result.

12. The multi-database system of claim 11 wherein storing the result comprises:
    storing the result on a third database system.

13. The multi-database system of claim 11 wherein continuing to execute the query comprises continuing to execute the query on a system database selected from a group of system databases consisting of:
    the first system database;
    the second system database; and
    a system database that is neither the first system database nor the second system database.

14. The multi-database system of claim 11 further comprising:
    determining that a workload management exception occurred, and as a result, checkpointing the spool.

15. The multi-database system of claim 14 wherein execution of the query follows a branching optimizer plan tree having a plurality of nodes and wherein:
    checkpointing is only performed at a node having at least one alternative branch.

16. A computer program, stored in a non-transitory computer-readable medium, for optimizing execution of a query on a multi-database system comprising a first system database and a second system database, the program comprising executable instructions that cause a computer to:
    partially execute the query on a first system database by generating a spool;

determine that it is more efficient to store the spool on the second system database than to store the spool on the first system database, and in response:
store the spool on the second system database;
continue to execute the query by accessing the spool on the second system database;
complete execution of the query to produce a result; and
store the result.

17. The computer program of claim 16 wherein when storing the result the computer:
stores the result on a third database system.

18. The computer program of claim 16 wherein when continuing to execute the query the computer continues to execute the query on a system database selected from a group of system databases consisting of:
the first system database;
the second system database; and
a system database that is neither the first system database nor the second system database.

19. The computer program of claim 16 further comprising executable instructions that cause the computer to:
determine that a workload management exception occurred, and as a result, checkpointing the spool.

20. The computer program of claim 19 wherein executing the query follows a branching optimizer plan tree having a plurality of nodes and wherein:
checkpointing is only performed at a node having at least one alternative branch.

* * * * *